Feb. 25, 1936.  M. P. McCARTY  2,031,840
CONDENSER TESTER
Filed Feb. 3, 1933
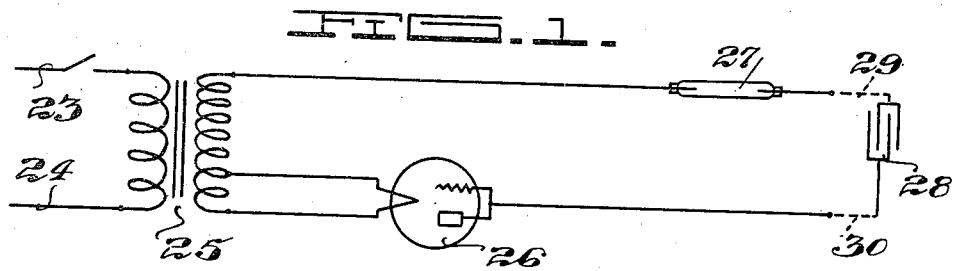
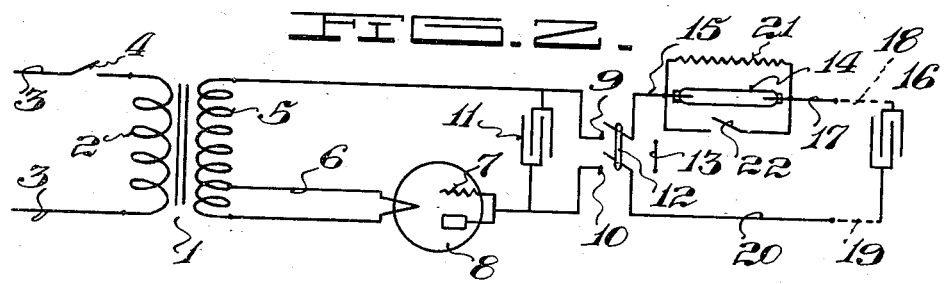
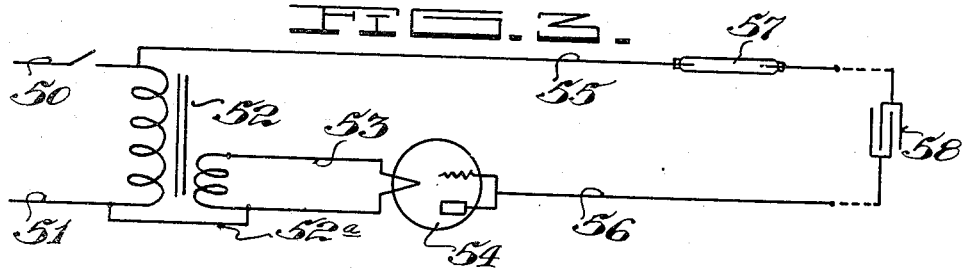
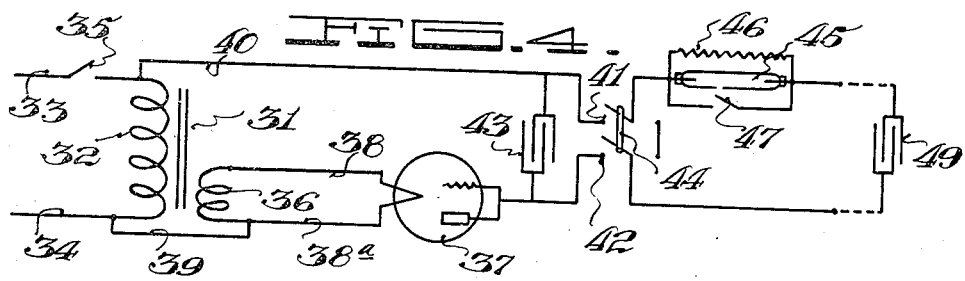
Madison P. McCarty
INVENTOR
Ernest G. Hood
ATTORNEY Patented Feb. 25, 1936

2,031,840

UNITED STATES PATENT OFFICE 2,031,840

CONDENSER TESTER

Madison P. McCarty, Dallas, Tex., assignor of one-half to Clarence E. Boren, Dallas, Tex.

Application February 3, 1933, Serial No. 655,075

1 Claim. (Cl. 175—183)

This invention relates to electrical testing devices and it has particular reference to a device or instrument for testing electrical condensers.

The principal object of the invention is to provide an instrument of the character specified by which to test electrical condensers and particularly the types used in the ignition system of automobile vehicles but not necessarily restricted to such use, since it may be also employed for testing condensers forming a part of the electrical equipment of radios and in any other cases where condensers are used.

Another object of the invention is to provide a quick and simple means for testing condensers which indicates visibly the fitness of the condenser for its intended use and further to provide an instrument of simple and inexpensive construction and simple circuit or circuits. It frequently happens that a condenser will show faulty under ordinary circumstances and conventional tests and might be declared worthless when, as a matter of fact, it may not be defective and vice versa.

Still another object of the invention is to enable a condenser to be tested without the necessity for special application or electrical knowledge on the part of the operator, it being required simply to attach suitable connections to the terminals of the condenser under test and upon closing the circuit of the invention, the fitness of the condenser for service will be revealed by the reaction in a neon or other gas filled tube or bulb.

Another object of the invention is to provide an instrument which is simple in operation and positive in results so that the most inexperienced mechanic or the layman can test any condenser with positive accuracy by following the few simple directions printed on the instrument.

With the foregoing objects as paramount, the invention has particular reference to its salient features of construction and arrangement of parts which will become manifest as the description proceeds, taken in connection with the accompanying drawing, wherein:—

Figure 1 is a diagrammatic view of one type of circuit employed in the present invention.

Figure 2 shows the circuit in Figure 1 modified.

Figure 3 is another form of circuit which may be employed in the present invention, and Figure 4 is a modified form of the circuit shown in Figure 3.

Continuing with a more detailed description of the drawing, it may be first mentioned that the invention comprehends primarily the provision of a combination of electrical elements including a neon bulb or tube and so related and arranged in an electrical circuit as to produce the desired effect, i. e., to visibly reveal the defects in a condenser by the behavior of the neon bulb. Accordingly, reference is primarily made to Figure 1 wherein is shown a diagrammatic view of an electrical circuit which may be effectively used in carrying out the invention in simplified form. This circuit is comparable to the circuit shown in Figure 2 wherein it is modified. In Figure 2 is a transformer 1 having a primary winding 2 and connected to a source of alternating current, not shown, through wires 3 provided with a switch 4. The secondary winding of the transformer 1 is shown at 5 and of suitable ratio for uses intended with a tap 6 to supply suitable current for heating the filament 7 of a conventional rectifying element 8. The grid and plate of this tube 8 are connected together to form a two element rectifier to thus produce half wave rectified current at the switch points 9 and 10. A condenser 11, of suitable capacity is connected across the switch points 9 and 10 to smooth out the peaks of the half wave rectified current and to raise the voltage.

A double pole, double throw switch 12 is provided in the circuit shown in Figure 2 and has a jumper 13 across one pair of the switch points. A neon bulb 14, having one terminal connected to one blade of the switch 12, through wire 15 and the other terminal arranged to be connected to one terminal of a condenser 16 under test through wire 17 and dotted connection 18. The other terminal of the condenser 16 is connected to the other blade of the switch 12 through the dotted connection 19 indicating one of the flexible leads, and wire 20.

A high resistance 21 of one megohm or more is shunted across the neon bulb 14 to eliminate the slight glow of the neon bulb present or manifested when certain types of paper insulated condensers are tested. A momentary contact switch or push button 22, normally open, is shunted across the neon bulb 14 for the purpose of throwing the full potential in the circuit across the condenser 16 under test.

When the blades of the switch 12 are in contact with the switch points 9 and 10 and the switch 4 closed, supplying alternating current to the transformer primary 2, the alternating current induced in the transformer secondary 5 and rectified by the tube 8, stabilized and voltage increased by the condenser 11, passes through the neon bulb or tube 14 to the condenser 16 under test. Thus the condenser 16 under test becomes charged to the full voltage being maintained in the circuit. The fitness of the condenser for normal service therefore is obviously indicated by the behavior of the neon bulb 14.

When a condenser is tested with the circuit shown in Figure 2 and as above described, the neon bulb 14 will flash once when contact with the condenser is first established providing the condenser is good, thus showing that the condenser will take a charge and is not open circuited and not shorted. A leaking condenser will cause the neon bulb to flash intermittently, the rapidity or frequency of flashes being determined by the extent of the leak. The greater the leak, the more rapid the recurrence of the flashes. A shorted condenser will cause the neon bulb to glow continuously or steadily on one of its electrodes and an open circuited condenser under test will cause the neon bulb to fail to glow. If the blades of the switch 12 are thrown into contact with the shorting jumper 13 when a condenser 16 is in a charged condition the condenser will discharge through the neon bulb 14, causing a flash on one electrode opposite the electrode that showed the flash when the condenser was charged. The intensity or value of the flash gives a comparative indication of the capacity of the condenser. The dotted lines 18 and 19 in Figure 2 are suggestive of flexible leads or test prods, as previously mentioned.

Referring again to Figure 1, it will be noted that there is little difference between the circuit just described and that shown in this figure, the principal difference being in the omission of the double pole, double throw switch 12 and the high resistance 21 and push button switch 22. The circuit in Figure 1 also lacks the condenser 11. This circuit includes only the A. C. lines 23 and 24 with the transformer 25. The rectifier tube 26 is included in a circuit with the neon bulb 27 as in the preceding instances. The condenser under test is designated at 28 and to which connection is made through leads 29 and 30.

Referring to Figure 4, a further modified circuit is shown and which comprises a transformer 31, having a primary winding 32 and connected to A. C. source through wires 33 and 34 and switch 35. The secondary winding is shown at 36 and is connected to the rectifier tube 37 through the wires 38 and 38a and is of sufficient ratio to supply current to heat the filament of this tube.

A jumper 39 connects one side of the supply circuit 34 and primary winding 32 with one side of the secondary winding 36 in such manner that the voltage induced in the secondary winding 36 will be additive in relation to the voltage impressed across the primary winding 32. The other side of the primary winding and supply circuit is connected by the wire 40 to the switch point 41 and the grid and plate of the tube 37 are connected to the switch point 42. Thus a half wave rectified current is delivered to the points 41 and 42. It will be noted that the circuit in Figure 4 beyond the rectifier tube 37 is precisely the same as that part of the circuit shown in Figure 2, previously described. This portion of the circuit includes a condenser 43 and a switch 44 comparable to the switch 12 shown in Figure 2 as is likewise the neon tube 45, high resistance 46 and switch 47. The condenser under test is shown at 49.

The circuit shown in Figure 3 is similar to the circuit just described and illustrated in Figure 4 except that in this circuit, the condenser 43, switch 44, high resistance 46, and switch 47 are omitted. This circuit includes the A. C. wires 50 and 51 and the transformer 52 having connection through the jumper 52a and tap 53 to the rectifying element 54. Wires 55 and 56 complete the circuit through the neon tube 57 and the condenser 58 under test.

The purpose of the transformer designated at 52 in Figure 3 and at 31 in Figure 4 is to provide current to heat the filament of the rectifying element in each instance, also to add the voltage of the secondary of same to the output circuit. The rectifying element serves to rectify the A. C. to half wave pulsating D. C. as previously set forth in the foregoing. The condensers 11 and 43 serve to smooth out the rectified D. C. and to increase the voltage and milli-amperage in the circuit.

In the drawing, the rectifying element is represented as a three element vacuum tube converted into a two element rectifier by connecting together the grid and plate. Such tubes connected in this manner are inexpensive, however any kind of suitable rectifying tube or element may be effectively used.

When a condenser is to be tested it is connected in multiple with the condenser in the testing instrument, the switch 12 is closed, whereupon the condenser under test becomes charged. The neon tube flashes as explained by reason of the current flow established therethrough and an electrical balance is obtained which remains constant, provided the condenser under test is not defective.

It will be readily understood from the foregoing by those skilled in the art, that any other electrical element or circuit inserted between the contact terminals for testing condensers, may likewise be tested and the results observed from the actions of the neon tube.

Manifestly, the construction shown is capable of considerable modification and such modification as is considered within the scope and meaning of the appended claim is also considered within the spirit and intent of the invention.

What is claimed is:

A condenser testing circuit comprising a neon tube, a rectifier, terminals for connecting a condenser in series with the rectifier and tube, and means for uniting said circuit to an alternating current supply circuit.

MADISON P. McCARTY.